No. 732,739. PATENTED JULY 7, 1903.
C. H. HANSEN.
AWNING.
APPLICATION FILED MAR. 16, 1903.
NO MODEL. 2 SHEETS—SHEET 1.
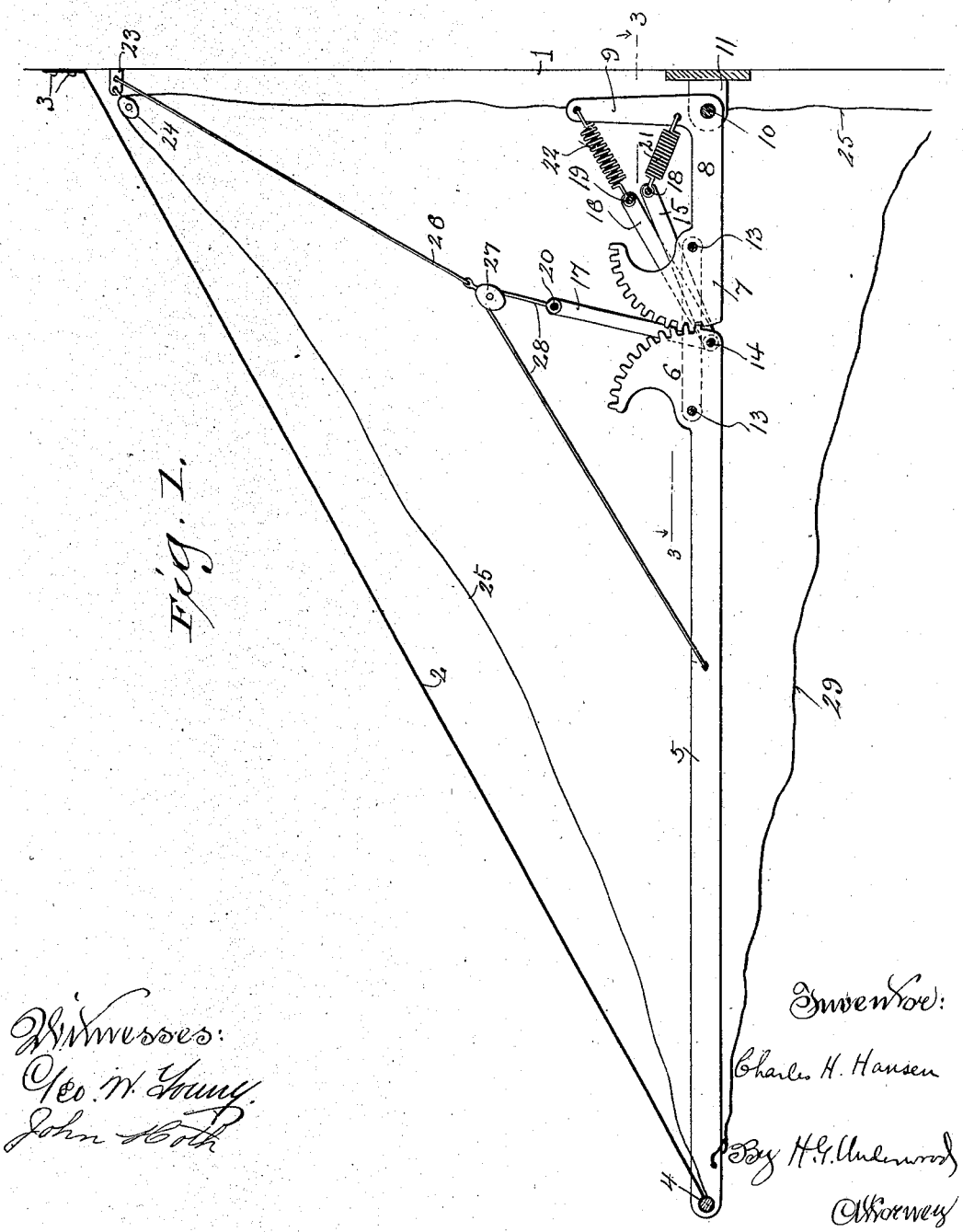

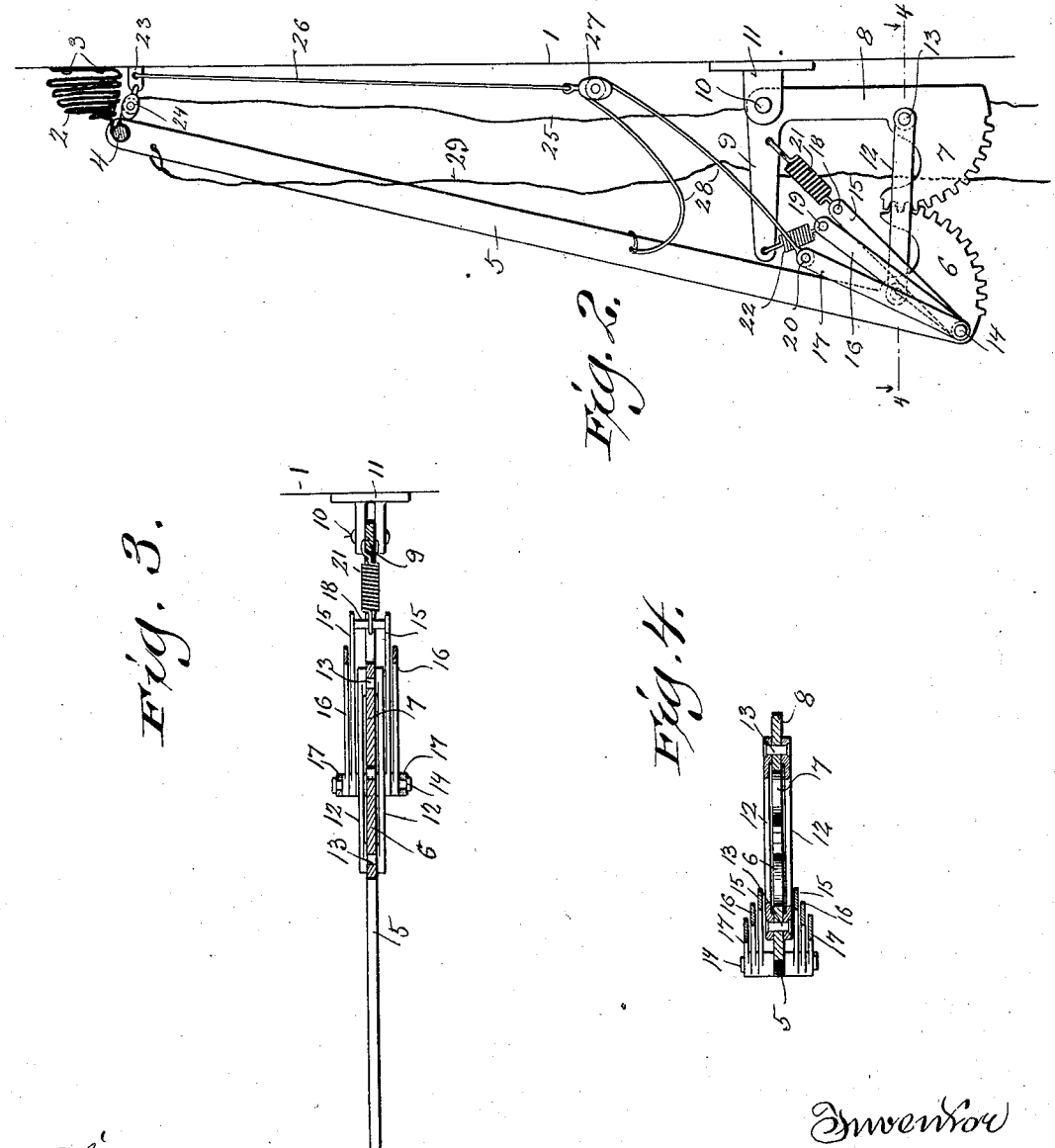

No. 732,739. Patented July 7, 1903.

UNITED STATES PATENT OFFICE.

CHARLES H. HANSEN, OF RACINE, WISCONSIN.

AWNING.

SPECIFICATION forming part of Letters Patent No. 732,739, dated July 7, 1903.

Application filed March 16, 1903. Serial No. 147,877. (No model.)

*To all whom it may concern:*

Be it known that I, CHARLES H. HANSEN, a citizen of the United States, and a resident of Racine, in the county of Racine and State of Wisconsin, have invented certain new and useful Improvements in Awnings; and I do hereby declare that the following is a full, clear, and exact description thereof.

My invention relates especially to an awning-frame and its joints; and it consists in certain peculiarities of construction and combination of parts, as will be fully set forth hereinafter in connection with the accompanying drawings and subsequently claimed.

In the said drawings, Figure 1 is a view in side elevation of one of my jointed frames (of which there are two for each awning) in the lowered position; and Fig. 2 is a like view of the same in the raised position, portions being removed or shown broken away or in section in both figures to better illustrate certain details. Fig. 3 is a detail sectional view taken on the line 3 3 of Fig. 1, and Fig. 4 is a like view taken on the line 4 4 of Fig. 2.

Referring by numerals to the drawings, 1 indicates the outer wall of a building, to which the upper end of an awning 2 is permanently attached, as by nails or screws 3 3, the lower end of said awning being secured to a rod 4, which extends between the outer ends of the long sections 5 of my awning-frame, only one side of which is shown, the other side being an exact duplicate thereof and the two sides being separated the width of the awning employed. The inner ends of these long sections 5 terminate in toothed sector-plates 6, which mesh with corresponding toothed sector-plates 7 at the adjacent ends of the short sections 8 of the frame. These short sections 8 are, in effect, bell-crank levers, having arms 9 at their inner ends, and are pivotally secured by pivot-bolts 10 to brackets 11, which latter are fastened to the building-wall 1. The sector-plates 6 7 are pivotally connected by double links 12 12, (one on each side of said sector-plates,) whose ends are united by bolts 13 13, passing through holes in said sector-plates. The sector-plate 6 is further formed with another hole therethrough for the pivot-bolt 14, on which are mounted the lower ends of three double straps, (marked 15 15, 16 16, and 17 17, respectively,) the forward ends of these three double straps being respectively united by the bolts 18, 19, and 20. From the bolt 18, which unites the outer ends of the double strap 15 15, a spring 21 extends to the arm 9 of the bell-crank or short section 8, adjacent to the pivotal point 10 thereof, while from the bolt 19, which unites the outer ends of the double straps 16 16, another spring 22 extends to the outer end of the said arm 9.

A bracket 23 is secured to the building-wall 1 just below the line of attachment of the upper end of the awning 2, and a sheave 24 is suspended from this bracket, over which a rope 25 passes, one end of this rope being secured to the rod 4 at the front end of the awning and the other end hanging down adjacent to the wall 1. Another rope, 26, is secured to this same bracket 23, and the lower end of this rope carries a sheave 27, over which still another rope, 28, passes, one end of this last-named rope being secured to the hereinbefore-named long frame-section 5 and the other end of said rope being fastened to the bolt 20, which unites the upper ends of the double strap 17 17.

29 is a rope on the outer end of one of the frame-sections 5.

The operation of my device will be readily understood from the foregoing description of its construction, taken in connection with the accompanying drawings. Let it be understood that the awning is down, with the parts in the respective positions shown in Fig. 1. In order to raise the awning, a pull is given upon the rope 25, and as the outer ends of the long sections 5 of the frame begin to rise the short sections 8, through the action of the sector-plates 6 7, begin to lower, (carrying the inner ends of the sections 5 with them,) this action drawing on the spring 21, through the double strap 15 15, until as the sections 5 approach a vertical position the said spring 21 begins to retract and draws the upper ends of the sections 5 over toward the wall 1 until the parts are in the positions shown in Fig. 2, when the spring 22, which was drawn out and under tension at the beginning of the raising operation, is fully retracted, owing to the near approach of the ends of the arms 9 and double straps 16 16, and the awning is fully raised. The awning can be kept in this position by fastening the rope 25, and when it is desired to again lower the awning this rope is released and the rope 29 given a sharp outward pull, and the long sections 5 will begin to descend by gravity, the spring 22 being thereby subjected to tension and serving to balance the weight of the sections 5 until the parts are again in the lowered position. (Shown in Fig. 1.) As the frame-sections 5 begin to rise and the sector-plates 6 7 to lower in the operation of raising the awning already described the weight of said sector-plates will materially aid in raising the said sections 5, and as the sector-plates begin to descend they draw (through double strap 17 17) on the rope 28, thus aiding greatly in the raising of the said sections 5 and enabling this to be done with much less exertion than if there were single instead of jointed frame-sections, and this rope 28 continues to exert its pull until the frame-sections 5 stand at about forty-five degrees, when the rope 25 has a more direct pull, as the end of said rope connected with frame-sections 5 begins to get more nearly in line with the sheave 24, so that less force is needed to complete the raising of the awning, and the rope 28 is then slack, as shown in Fig. 2, and when said awning is again lowered this rope 28 serves to steady the descent and balance the weight of the outer ends of said sections 5, which are thus lowered gradually and without any quick jerk.

Having thus described my invention, what I claim as new, and desire to secure by Letters Patent, is—

1. In an awning-frame, the combination of long and short frame-sections, terminating at their adjacent ends in toothed sector-plates, in mesh with each other and the other ends of said short sections being pivotally secured to a stationary structure, and having angular projecting arms; links connecting the said sector-plates; spiral springs connected to said angular arms, and series of double straps pivotally secured to the sector-plates of the long sections, and also connected to said springs.

2. The combination of long frame-sections terminating in toothed sector-plates at their inner ends; short frame-sections pivotally secured to a stationary structure and having toothed sector-plates at one end, in mesh with the sector-plates of the long sections, and angular arms at the other end; links connecting the said sector-plates; series of double straps pivotally secured to the sector-plates of the long sections; springs connecting certain of said double straps to the angular arms of the short sections; a transverse rod at the outer ends of the long sections; an awning permanently secured to said rod and to said stationary structure; a pair of sheaves suspended from said stationary structure; a rope secured to said transverse rod, and passing over one of said sheaves; and another rope secured to one of said long sections, and passing over the other sheave, and then secured to another of the said double straps.

3. In an awning-frame, the combination with long and short frame-sections, terminating at their adjacent ends in toothed sector-plates, in mesh with each other, and the other ends of said short sections being pivotally secured to a stationary structure, of links connecting the said sector-plates, a sheave, suspended from said structure; a strap pivotally secured at one end to the lower end of the outer sector-plate, and a rope secured to the other end of said strap and passing over said sheave and then secured to the adjacent long frame-section, intermediate of its sector-plate and outer end.

In testimony that I claim the foregoing I have hereunto set my hand, at Milwaukee, in the county of Milwaukee and State of Wisconsin, in the presence of two witnesses.

CHARLES H. HANSEN.

Witnesses:
H. G. UNDERWOOD,
N. E. OLIPHANT.